March 12, 1940.  L. F. BLACK  2,192,887
METHOD FOR LOCALIZING FOREIGN BODIES
Filed March 4, 1938
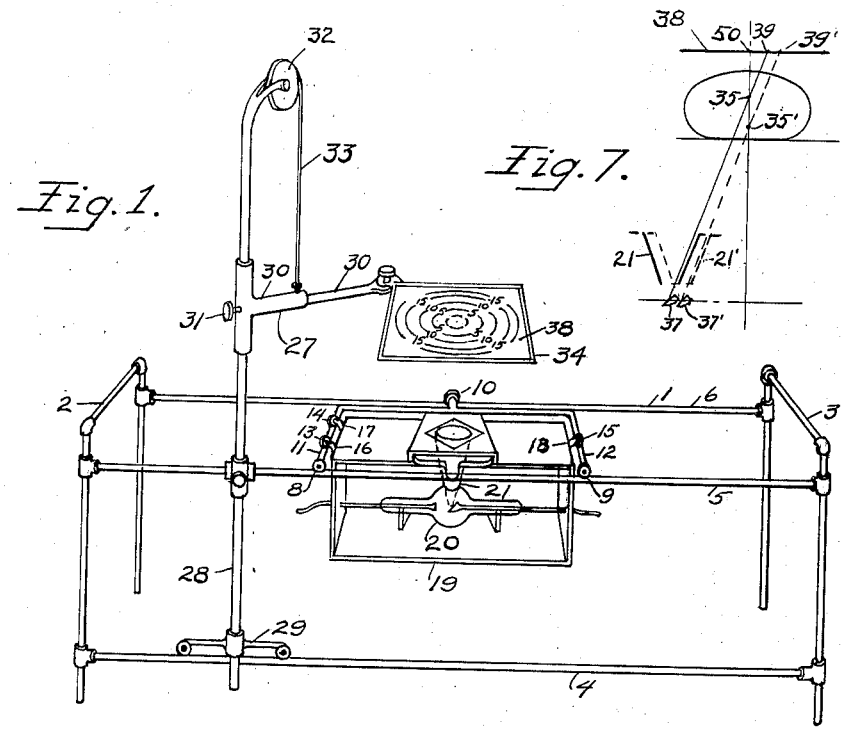
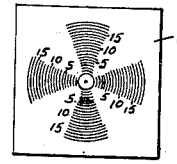
Fig.3.
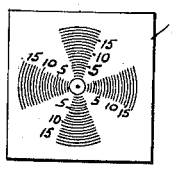
Fig.5.
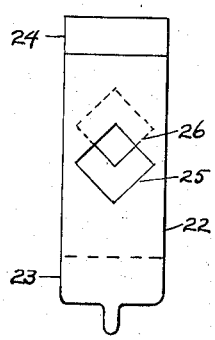
Fig.6.
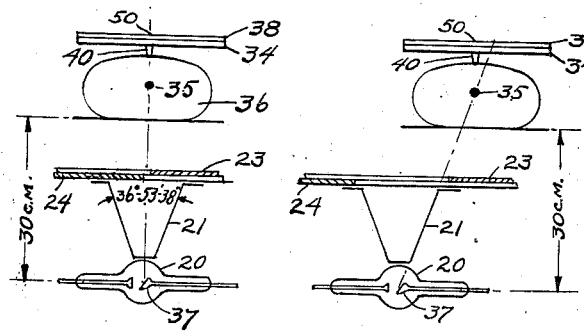
Fig.2.  Fig.4.
Inventor
Lawrence F. Black
By (signature)
Attorney Patented Mar. 12, 1940

2,192,887

UNITED STATES PATENT OFFICE 2,192,887

METHOD FOR LOCALIZING FOREIGN BODIES

Lawrence F. Black, Washington, D. C.

Application March 4, 1938, Serial No. 193,847

3 Claims. (Cl. 250—59)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to a method for localizing foreign bodies, but more particularly it is directed to a method of localization based on the degree of separation of shadows of the foreign objects cast by X-rays for a predetermined change of position of the source of radiation.

One object of the invention is to provide a simple, accurate, and inexpensive method for determining the location of foreign bodies during X-ray examination without altering the structure of the X-ray apparatus.

Another object of the invention is to provide a device by which the location and extent of various organs may be measured.

Referring more particularly to the accompanying drawing in which corresponding parts are indicated by similar reference characters:

Fig. 1 shows a perspective view of an X-ray table with tube carriage and screen carrier;

Fig. 2 is a diagrammatic view showing the target, the center mark of the measuring chart, and the foreign body arranged in vertical alignment;

Fig. 3 is a plan view of the measuring chart as projected from side elevation, shown in Fig. 2;

Fig. 4 is a diagrammatic view showing a vertical alignment of the center mark of the measuring chart and the foreign body, with a displacement of the target;

Fig. 5 is a plan view of the measuring chart as projected from the side elevation, shown in Fig. 4;

Fig. 6 illustrates a standard type of shutter, and

Fig. 7 is a diagrammatic view illustrating the relationship between the position of the shadow and the depth of the object.

Referring to the drawing, particularly Fig. 1, the numeral 1 indicates an X-ray table comprising end frames 2 and 3 and longitudinal spacing rods 4, 5 and 6, the upper rods 5 and 6 functioning as tracks for the cradle frame 7 provided with circumferentially grooved rollers 8, 9 and 10, which permit a longitudinal movement of the cradle frame 7 along the spacing rods 5 and 6. The rectangular form of the cradle frame 7 provides transverse tracks 11 and 12 for the support and transverse movement of the rollers 13, 14 and 15, which are rotatably mounted on brackets 16, 17 and 18, attached to a cradle 19 in which is supported X-ray tube 20.

Within the cradle 19 is mounted a cone 21 the central axis of which corresponds to a vertical beam from the target of the X-ray tube. Opposite elements on the surface of the cone subtend a predetermined angle such as one 36°—53'—38", which is usually the angle adopted in the construction of this type of apparatus. The cone limits the divergence of the pencil of rays from the target 37 so that the operator may direct the radiation to the locality desired.

A litter (not shown) adapted to support the patient is mounted on the X-ray table 1. When reclining on the litter the body of the patient is retained at a predetermined distance above the longitudinal centerline of the target, as indicated diagrammatically in Figs. 2 and 4, in which 30 c. m. is shown as a convenient distance.

A shutter 22 is mounted in the cradle 19 above the cone 21. The shutter 22 may be formed with two slidable lead numbers 23 and 24 provided with diagonally arranged square openings 25 and 26 respectively, as shown in Fig. 6, or any other standard form of shutter may be used.

A fluoroscopic screen carriage 27 is provided which comprises an upright supporting member 28, mounted on a roller frame 29, and longitudinally movable along the spacing rods 4 and 5. The fluoroscopic screen is held by a radial member 30 which is slidably mounted on the upright supporting member 28. The radial member is provided with a thumb screw 31 adapted to retain the radial member and screen at any desired height. A counter-balancing device comprising a sheave 32 over which is passed a weighted cable 33 attached to the radial member 30, is provided to facilitate vertical adjustment of a fluoroscopic screen 34. The weight (not shown) at the other end of the cable is slidably mounted within the upright supporting member.

The X-ray table 1 with its tube cradle 19, and screen carriage 27, is standard equipment and is shown only to illustrate the functions of the various elements used in the improved method for localizing foreign objects.

To obtain lineal measurements with respect to the location of the object, a chart is used in conjunction with the fluoroscopic screen. The chart which is of the same contour as the screen and adapted to be placed on top of the latter, is marked with a center point and concentric arcuate graduations which indicate distances from the center.

In order to determine the depth of a foreign object 35 located within a body, it is necessary to first align the target 37 of the tube 20, the foreign body 35 and the center of a chart 38 in a vertical line. To do this the shutter 22 is closed down to a very small opening, the tube 20 moved on its cradle 19 until the target underlies the foreign body 35, the chart 38 placed on the fluoroscopic screen 34 and the screen moved on its support until the center of the chart overlies the foreign object 35. The source of X-ray examinations on the target 37, the foreign body and the center of the chart 38 are thus arranged in vertical alignment, as shown in Fig. 2.

The tube 20 is then shifted horizontally by moving the cradle 19 and as this is done, it will be noted that the shadow of the object moves outward on the chart 38 from its center point, as shown in Fig. 4. The horizontal movement of the tube 20 is continued until the disappearance of the shadow of the object is noted, which is reached at the conical limit of the pencil of rays from the target 37. The location of the shadow of the foreign body at this point of disappearance is then noted on the chart and the scale which is graduated in concentric arcs read to determine the depth at which the foreign object lies below the surface of the body under examination.

The distances on the chart from the center to the graduated arcs gives a direct reading of the depth, as the graduations are in terms of proportional distances from the center of the chart to the vertex of the triangle, as illustrated in Fig. 7.

In Fig. 7, 37 represents the target, 35 the foreign body and 39 the location of the shadow of the foreign body on the chart 38. If the foreign body were at 35' the location of the shadow of the foreign body would be at 39', as the angular limit of the pencil of rays from the target is kept constant by movement of the cone 21 with the target as indicated by 21'. It will therefore be noted from the figure that the distance from the center 50 of the chart to the shadow is directly proportional to the depth of the foreign object below the center of the chart, as these distances are measured along the sides of similar right angle triangles 50—35—39 and 50—35'—39'.

In Figs. 2 and 4, a small contact member 40 will be noted projecting from the center of the lower surface of the fluoroscopic screen 34. This projection is adapted to keep the screen at a constant relationship with respect to its distance from the body, so that measurements on flat surfaces or at hollow places will give the correct reading with respect to the depth of a foreign object imbedded at either of such localities.

Having described my invention, what I claim as new and wish to secure by Letters Patent is:

1. A method for utilizing penetrative rays for localizing foreign objects embedded in a body consisting in directing a penetration ray upon the object to be localized, confining the divergency of said rays to a predetermined angle, casting a shadow of said object at a predetermined point on a fluoroscopic screen, located at a fixed distance above the body, causing said shadow to travel across the screen until it fades from view and then measuring the distance between the point on the fluoroscopic screen at which the shadow initially appeared and the point of its disappearance to determine the depth of the foreign object in the body.

2. A method for localizing, by X-rays, foreign objects imbedded in a body, consisting in providing a fluoroscopic screen, locating a source of X-ray emanations at a predetermined distance beneath the screen, confining the divergency of the X-ray emanations to a predetermined angle, positioning the X-ray source so that a plane normal to the screen and passing through the object to be localized bisects the angle of divergence to which the emanations from said source have been confined, whereby to project a shadow on said screen, shifting the X-ray source until the shadow moving across the screen fades from view, and utilizing the distance between the initial position of the shadow and the point of fade-out to determine the depth of the object beneath the surface of the body under examination.

3. A method for localizing, by X-rays, foreign objects imbedded in a body, consisting in providing a fluoroscopic screen having thereon a chart, locating a source of X-ray emanations at a predetermined distance beneath the screen, providing a cone to limit the divergency of the X-ray emanations to a predetermined angle, positioning the X-ray source so that a shadow of the foreign object will be projected along the central axis of said cone to the center of said chart, shifting the X-ray source until the shadow moving across the chart fades from view, and utilizing the distance of its point of fade-out from the center of the chart, to determine the depth of the object beneath the surface of the body under examination.

LAWRENCE F. BLACK.